Nov. 10, 1959      B. EVANS      2,912,286
FLUID PRESSURE POWER BRAKE SYSTEM
Filed March 29, 1957
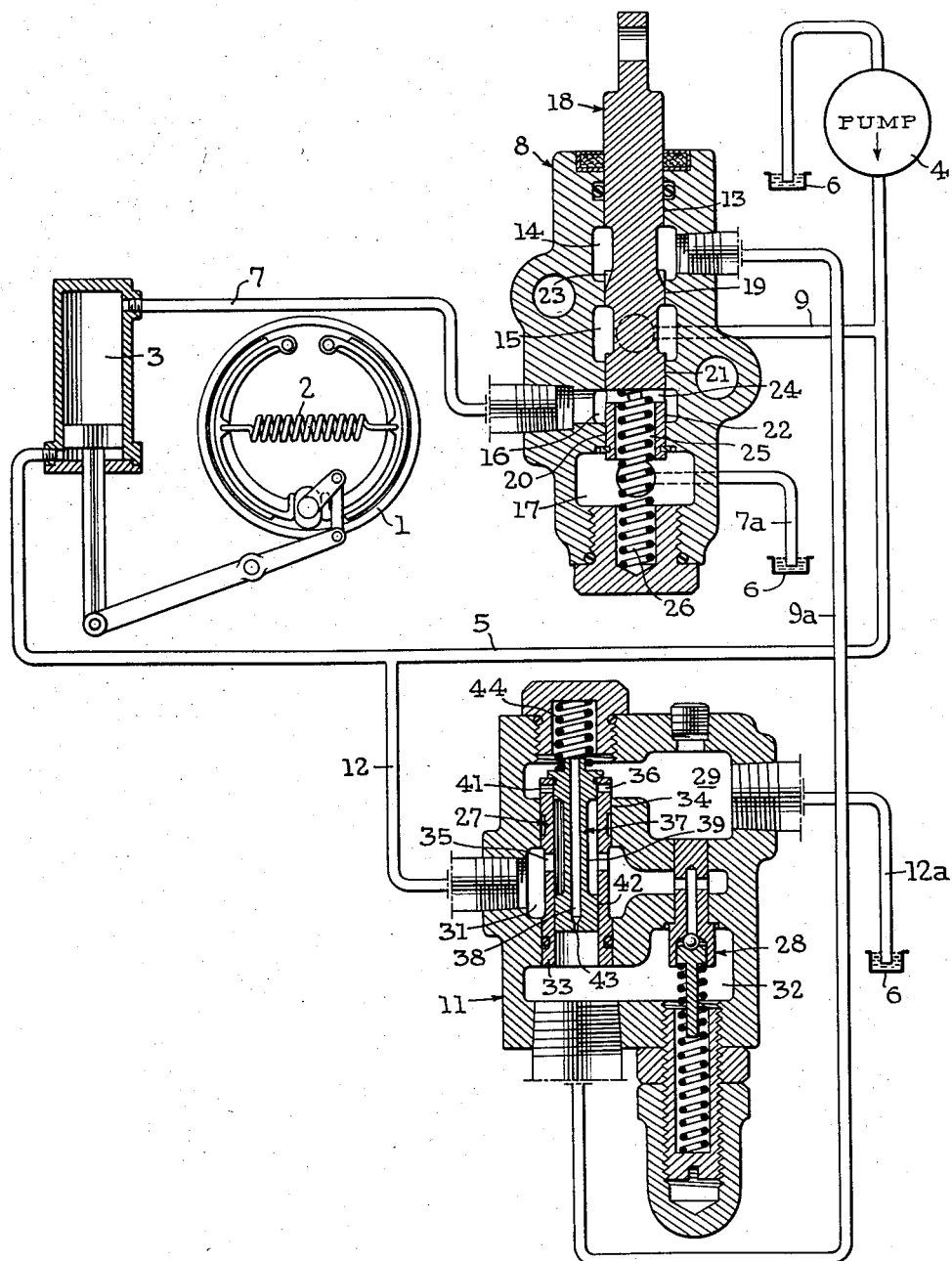
INVENTOR
Barry Evans
BY *Dodge and Sons*
ATTORNEYS

2,912,286

FLUID PRESSURE POWER BRAKE SYSTEM

Barry Evans, Springfield Township, Montgomery County, Pa., assignor to The New York Air Brake Company, a corporation of New Jersey Application March 29, 1957, Serial No. 649,430

8 Claims. (Cl. 303—49)

This invention relates to power brake systems, and more particularly to such systems which afford precise control action.

Power brake systems are well known in the art, but their use in environments where precise control is required is limited, because of certain inherent disadvantages. In the first place, conventional power brake systems which distribute pressure fluid to a brake-actuating motor in accordance with a braking command, possess low response characteristics because of the time delay required to build up the desired operating pressure. Further, even when hydraulic fluid is used as the power medium, the rate of pressure build-up must be modulated, in order to avoid shocks which would cause harsh braking action.

The object of the present invention is to provide a power brake system which responds rapidly to the operator's command and which produces a braking force proportional to this command. Briefly, the system comprises a brake biased to follow an actuating cam which is positioned by a brake-actuating motor, a pressure line connecting the motor to a source of pressure fluid, a fluid by-pass line connected to this pressure line, and valve mechanism for selectively restricting the by-pass flow in accordance with the operator's command so as to vary the pressure in the pressure line and consequently the braking force exerted by the actuating motor. As distinguished from the conventional system, the present arrangement continuously pressurizes the brake-actuating motor and effects an operation of the brake by selectively relieving this pre-existing pressure. In this way, the time delay required to build up the desired control pressure is eliminated.

The present system also incorporates valve means for use in conjunction with a double-acting differential area brake-actuating motor for equalizing the pressures across said motor when the pressure in the pressure line has been reduced to a predetermined minimum. This arrangement produces a net force at the motor which returns the actuating cam to its neutral position and insures that the brake will be released.

A preferred embodiment of the invention will now be described in relation to the accompanying drawing which illustrates the system partly in schematic form, when the pump is at rest and the brake is in the inactive position.

Referring to the drawing, the system is shown as controlling a conventional brake 1, having a light spring 2 biasing the shoes into contact with the actuating cam. When the cam is in the inactive position (as shown) its contour permits the shoes to form a scuff fit with the drum. As used in this description, the term scuff fit means that the shoes are in very ligh contact with the drum. The brake is operated by a double-acting differential area piston motor 3 which is connected to it by conventional linkage as shown. The rod end of the motor 3 continuously communicates with a pump 4 by way of pressure line 5, and the piston end of the motor is connected to the sump 6 via vent lines 7 and 7a. An operator's control valve 8 is disposed in a first branch line 9 for establishing a flow rate in line 9a proportional to the movement of the valve plunger. This valve also functions to regulate the flow in the vent line 7, as will hereinafter appear. A combined by-pass and relief valve 11 is located in a second branch line 12 for limiting the pressure in line 5 and for reducing this pressure in accordance with the flow rate established in the branch line 9a. Since the pump 4 always supplies pressure fluid to the motor 3, the brakes are normally in the active position when the pump is running.

The operator's control valve 8 comprises a housing having a central bore 13 and four axially displaced annular chambers 14, 15, 16 and 17 which communicate therewith. A plunger 18, having its upper end formed for attachment to a suitable brake pedal or control lever (not shown), is slidably received in the bore 13 for controlling communication between the annular chambers. The plunger is formed with controlling lands 19, 21 and 22; the first of these having throttling grooves 23 located in the upper edge thereof. The lands 21 and 22 are separated by a cross passage 24 which communicates with an axial bore 25 formed in the lower end of the plunger. The plunger is biased to its uppermost position by means of the spring 26.

The valve 11 comprises a by-pass valve 27 and a conventional relief valve 28 which control communication between the chambers 29, 31 and 32. The by-pass valve consists of a sleeve 33, mounted in a bore 34 and containing two series of radial passages 35 and 36. A valve member 37, having a through passage 38 formed along its longitudinal axis, is slidably received within the sleeve 33. The member 37 is formed with an undercut portion 39 which separates lands 41 and 42 at each end thereof. An orifice 43 is located at the lower end of the longitudinal passage 38. A biasing spring 44, reacting between the valve housing and the member 37, urges the latter to the position shown in the drawing.

Operation of the system

As illustrated, the pump is at rest and the piston of motor 3 is in its lowermost position. Under these circumstances, the cam is in its neutral position and the shoes, which are biased into contact with the cam, form a scuff fit with the drum.

When the pump begins to supply fluid to the line 5, the motor piston moves upward causing the cam to move the brake shoes into contact with the drum. It should be noted that since the shoes form a scuff fit with the drum in the inactive position of the brake, the motor piston need move only a short distance before the shoes are in full contact with the brake drum. The braking force exerted by motor 3 is directly proportional to the pressure in line 5 and this pressure is held constant by the relief valve 28 which by-passes fluid from line 5 to sump 6 via line 12, chambers 31 and 32, orifice 43, passage 38, chamber 29, and line 12a.

When the pump 4 is operating at full speed and is delivering a maximum volume of fluid to pressure line 5, the pressure drop across orifice 43 will cause the valve member 37 to rise against the bias of spring 44, thereby permitting a portion of the pressure fluid to flow to sump 6 via line 12, chamber 31, radial passages 35, undercut 39, radial passages 36, chamber 29, and line 12a. Thus it is seen that the entire volume of fluid delivered by pump 4 is by-passed to sump 6 by the valves 27 and 28, and, that the pressure established in line 5 depends on the position of valve member 37. If the pressure in line 5 rises above the setting of relief valve 28, a greater quantity of fluid will be passed through the relief valve to chamber 32, and since this increased flow will also increase the pressure drop across orifice 43, the valve member 37 will move upward an additional amount and thereby relieve the pressure in line 5. The reverse action will occur when the pressure in line 5 decreases below the setting of the relief valve 28.

In order to reduce the braking force, the operator moves the control valve plunger 18 in a downward direction interconnecting chambers 14 and 15 across the plunger land 19. Because of the action of throttling grooves 23, a flow rate proportional to the displacement of the plunger is established in branch line 9a. The flow of fluid from this line to the chamber 32 of valve 11 increases the pressure drop across orifice 43, thereby causing the valve member 37 to move upward from its current position. This movement of the by-pass valve progressively decreases the back pressure on the fluid flowing from line 12 to the sump 6 and therefore reduces the pressure in line 5. As the pressure in line 5 decreases, the relief valve 28 will close and the position of by-pass valve 27 will be controlled solely by the flow from the branch line 9a.

It should be apparent that the pressure in line 5, and consequently the braking force exerted by motor 3, is directly related to the position of plunger 18 and therefore, as the plunger is progressively moved downward, the braking force is correspondingly reduced.

Should the operator wish to completely release the brakes, he would simply depress the control valve plunger 18 to its lowermost position, thereby increasing to a maximum the flow in branch line 9a and the opening of by-pass valve 37, and consequently reducing to a minimum the pressure in line 5 and the force exerted by the motor 3. In order to assure a complete release of the brake, the control valve 8 is also provided with means for pressurizing the piston end of the motor 3. In this connection, as the plunger 18 establishes a maximum flow rate between chambers 14 and 15, the vent line 7, which, up to this point, has been in communication with the sump via chamber 16, across passage 24, bore 25, chamber 17, and line 7a, is now connected to the branch line 9, via chamber 15 and the plunger undercut between lands 19 and 21. Inasmuch as the pressure in branch line 9 is the same as that in pressure line 5, the pressures across the piston of motor 3 will be equalized. Since the motor employs a differential area piston, this equalized pressure will produce a net downward force tending to move the piston and cam to the position shown in the drawing. When this position is reached, the biasing spring 2 will have completely moved the brake shoes to the inactive position against the cam.

In order to reapply the brake, the operator allows the control plunger 18 to move upward under the action of spring 26, thereby reconnecting vent line 7 to the sump 6 via the line 7a and reducing the flow rate in branch line 9a. As will appear from the preceding description, this reduced flow rate results in a downward movement of valve member 37 with a consequent increase of pressure in line 5. Since the vent line 7 is now connected to the sump, the increase of pressure in line 5 will cause the motor piston to move upward, thereby forcing the brake shoes into full contact with the brake drum. As the plunger 18 continues to move upward, the pressure in line 5 progressively increases up to the point where the flow in branch line 9a is completely interrupted. When this point is reached, the motor 3 will be exerting a maximum braking force which is determined by the characteristics of relief valve 28, as previously described.

As stated above, the system shown and described represents only a preferred embodiment of the invention. The scope of this invention should not be limited in any respect, except in accordance with the following claims.

What is claimed is:

1. In a brake system including a brake, a fluid pressure motor for operating the brake, a source of pressure fluid, and a pump, the combination of a pressure passage connecting the motor to the source, two branch passages in parallel flow relation with each other and each extending between the pressure passage and the sump; a manually operable valve for progressively varying the rate of flow in the first branch passage; a longitudinally shiftable valve member controlling flow through the second branch passage; a spring biasing the valve member to a flow interrupting position; a longitudinal passage extending through the valve member and forming a portion of the first branch passage downstream of the manually operable valve; and a metering orifice located in the longitudinal passage, said passage being so arranged that the pressures upstream and downstream of the orifice acting on opposite ends of the valve member open the valve against the bias of the spring an amount proportional to the rate of flow in the first branch passage.

2. The combination defined in claim 1 including a third branch passage connecting the pressure passage with the first branch passage at a point upstream of the metering orifice and downstream of the manually operable valve; and a relief valve located in the third branch passage for limiting the pressure in the pressure passage by diverting fluid from the pressure passage to the first branch passage.

3. In a brake system including a brake, a double-acting differential area piston motor for operating the brake, a source of pressure fluid, and a sump, the combination of a pressure passage connecting the rod end of said motor with the source; a vent passage connecting the piston end of the motor with the sump; two branch passages in parallel flow relation with each other and each extending between the pressure passage and the sump; a manually operable valve shiftable between minimum and maximum flow-establishing positions for progressively varying the rate of flow through the first branch passage; a by-pass valve controlling flow through the second branch passage; means responsive to the rate of flow through the first branch passage for varying the restriction afforded by the by-pass valve, whereby the pressure in the pressure passage varies in inverse relation to the rate of flow through the first branch passage; and a second valve operatively connected with the manually operable valve for disconnecting the vent passage from the pump and connecting that passage with the pressure passage when the manually operable valve is in its maximum flow-establishing position.

4. The combination defined in claim 3 in which the second valve progressively reconnects the vent passage with the sump as the manually operable valve moves toward its minimum flow-establishing position.

5. The combination defined in claim 4 including a third branch passage, said third passage extending between the pressure passage and the first branch passage; and a relief valve located in the third branch passage for limiting the pressure in the pressure passage by diverting fluid from this passage to the first branch passage.

6. In a brake system including a brake, a fluid pressure motor for operating the brake, a source of pressure fluid, and a pump, the combination of a pressure passage connecting the motor with the source; two branch passages in parallel flow relation with each other and each extending between the pressure passage and the sump; a manually operable valve shiftable between minimum and maximum flow-establishing positions for progressively varying the rate of flow through the first branch passage; a by-pass valve controlling flow through the second branch passage; and means responsive to the rate of flow through the first branch passage for varying the restriction afforded by the by-pass valve, whereby the pressure in the pressure passage varies in inverse relation to the rate of flow through the first branch passage.

7. The combination defined in claim 6 including a third branch passage, said third passage extending between the pressure passage and the first branch passage; and a relief valve located in the third branch passage for limiting the pressure in the pressure passage by diverting fluid from this passage to the first branch passage.

8. The combination defined in claim 6 in which the means for varying the restriction afforded by the by-pass valve comprises a metering orifice located in the first branch passage; and a fluid motor responsive to the pressure drop across said orifice.

References Cited in the file of this patent

UNITED STATES PATENTS

| | | |
|---|---|---|
| 1,838,668 | Frock | Dec. 29, 1931 |
| 2,142,628 | Ballert | Jan. 3, 1939 |
| 2,282,977 | Mast | May 12, 1942 |
| 2,658,589 | Ashton | Nov. 10, 1953 |
| 2,662,618 | Troyer | Dec. 15, 1953 |
| 2,699,102 | Doyle et al. | Jan. 11, 1955 |

UNITED STATES PATENT OFFICE
CERTIFICATE OF CORRECTION

Patent No. 2,912,286                                                       November 10, 1959

Barry Evans

It is hereby certified that error appears in the printed specifications of the above numbered patent requiring correction and that the said Letters Patent should read as corrected below.

Column 4, line 2, claim 1, line 45, claim 3, and line 61, claim 6, for the word "pump", in each occurrence, read -- sump --.

Signed and sealed this 26th day of April 1960.

(SEAL)

Attest:

KARL H. AXLINE
Attesting Officer

ROBERT C. WATSON
Commissioner of Patents